INVENTOR.
Aubrey T. Bracken
BY
Nobbe & Swope
ATTORNEYS

Sept. 7, 1965  A. T. BRACKEN  3,204,787
METHOD AND APPARATUS FOR FEEDING BATCH MATERIALS
Filed Feb. 18, 1963  3 Sheets-Sheet 2

INVENTOR.
Aubrey T. Bracken
BY
Nobbe & Swope
ATTORNEYS

Sept. 7, 1965  A. T. BRACKEN  3,204,787
METHOD AND APPARATUS FOR FEEDING BATCH MATERIALS
Filed Feb. 18, 1963  3 Sheets-Sheet 3

INVENTOR.
Aubrey T. Bracken
BY
Nobbe & Swope
ATTORNEYS

United States Patent Office 3,204,787
Patented Sept. 7, 1965

3,204,787
METHOD AND APPARATUS FOR FEEDING BATCH MATERIALS
Aubrey T. Bracken, Toledo, Ohio, assignor to Libbey-Owens-Ford Glass Company, Toledo, Ohio, a corporation of Ohio
Filed Feb. 18, 1963, Ser. No. 259,191
7 Claims. (Cl. 214—18)

The present invention relates broadly to the art of glass making and more particularly to an improved method and apparatus for continuously feeding batch materials to a glass-melting tank furnace.

The supplying of glass-making materials to a tank furnace, according to one known practice, has been to feed broken or scrap glass, known as cullet, substantially across the width of the centrally disposed doghouse or charging end of the furnace at a continuous, measured rate to provide a substantially evenly distributed layer on the surface of the body of molten glass in the furnace. As the layer of glass cullet is carried forwardly upon the body of molten glass moving from the charging area into the furnace proper, the raw granular or pulverulent glass-making materials are fed from a supply hopper to a continuously rotating, compartmented roll and thence deposited on the layer of cullet to form a relatively thick blanket-like layer of the combined glass-making materials on the surface of the molten glass substantially the width of the doghouse.

Generally speaking, the feeding of a relatively thick blanket like layer of cullet and raw glass-making materials on the body of molten glass has not proven entirely satisfactory in that the layer of cullet reduces radiation of heat from the molten glass to the raw glass-making materials thereby increasing the melting time of the raw batch materials and preventing rapid escape of gases or vapors produced in the raw batch materials as they become heated.

According to the present invention, there is provided a novel method and apparatus for avoiding these disadvantages by feeding the raw granular or pulverulent batch materials into the charging end of the furnace as two continuous relatively thin layers spaced from the longitudinal axis of the furnace while the glass cullet is supplied in proportionate amounts into the central area of the furnace between the spaced layers of raw batch materials. It has been found that by feeding the raw glass making materials and glass cullet into the furnace in this manner, the rate of batch melting is accelerated and the resultant molten glass obtained more homogeneous. This is attributable to the fact that the thinner layers of the raw batch materials offer less resistance to the transmission of heat both from the body of molten glass and from the highly heated atmosphere of the furnace. This enables an increase in the rate of feeding of batch to the furnace and, in consequence, an increased tonnage of glass produced by the furnace.

Other objects and advantages of the invention will become more apparent during the course of the following description when taken in connection with the accompanying drawings.

In the drawings, wherein like numerals are employed to designate like parts throughout the same:

Figure 1:
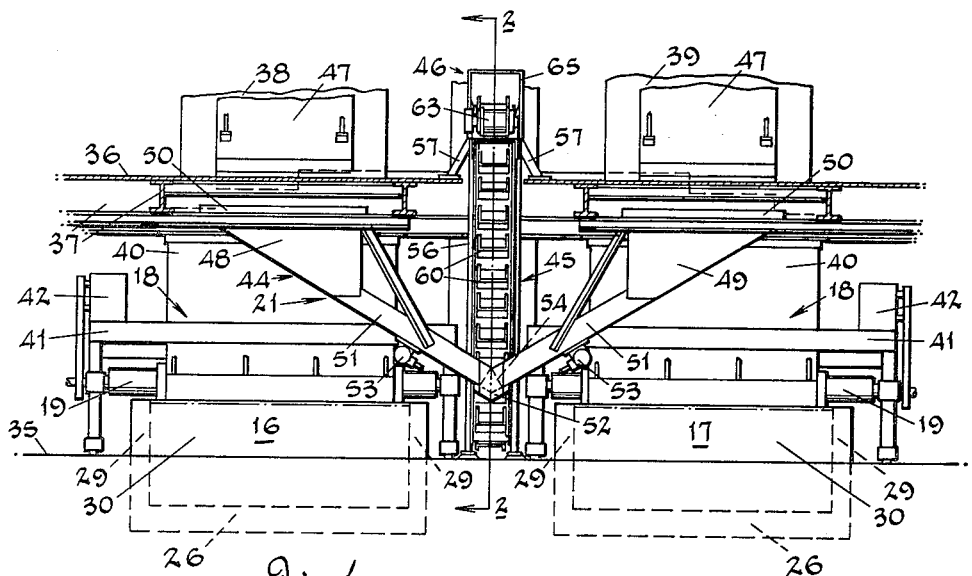
FIG. 1 is an end elevation of a tank furnace and batch feeding apparatus constructed in accordance with the present invention.

With reference now to the drawings and particularly to FIGS. 1 to 4, the glass melting tank furnace, generally designated by the numeral 15, is provided with spaced charging or doghouse areas 16 and 17; each having associated therewith batch feeding apparatus 18 including a continuously rotating, compartmented feed roll 19. As is customary with this type of feeding apparatus, the compartmented roll 19 receives measured quantities of raw granular or pulverulent batch materials from a source of supply and deposits them as a layer on the surface of the body of molten glass 20, which layer is carried forwardly into the melting zone M of the furnace. Contrary, however, to prior practice in which the glass cullet was initially discharged onto the body of molten glass and the raw batch deposited thereupon, the present invention contemplates the formation of separate layers of raw batch materials and glass cullet deposited directly upon the molten glass. The two layers of raw batch are spaced from one another and the glass cullet is fed into the furnace between the spaced layers of batch. This results in the raw batch materials being subjected directly to the thermal influence of the molten glass as well as to the heated atmosphere of the furnace thereby promoting more rapid transmission of heat through the mass of raw materials while the glass cullet in the center or medial area is also being reduced to molten consistency.

In carrying out the invention, batch feeding apparatus, generally designated by the numeral 21, is positioned between the doghouses 16 and 17 to receive glass cullet from a source of supply and discharge it into the tank furnace substantially at the longitudinal axis thereof.

The continuous tank furnace 15 includes the usual lower side walls 22, upper side breast walls 23, lower end wall 24, upper end breast wall 25, floor 26 and roof arch 27. The lower end wall 24 at the charging end of the furnace opens outwardly to provide the actual material charging or doghouse areas 16 and 17 which are defined by side walls 29, end walls 30 and the furnace floor 26. Likewise the end breast wall 25 is provided with arched openings 31 which are restricted in open area by vertically adjustable shade walls 32. Thus, as viewed in FIGS. 1, 3 and 4, it will be seen that the charging or doghouse areas 16 and 17 are substantially equally spaced from the longitudinal axis of the furnace as indicated by the broken line designated by the reference letter A.

As is conventional in regenerator-type tank furnaces, the upper side breast walls 23 are provided with oppositely disposed and suitably spaced burner ports 33 communicating with regenerator chambers (not shown). Upon reference to FIG. 3, the highly heated atmosphere of the melting zone M of the tank furnace is maintained at regulated temperatures by gaseous flames produced by burners arranged in the ports 33 in one side of the furnace and with the waste products of combustion exhausting through the opposed ports to heat the associated regenerator chambers. After a predetermined period of time, firing of the furnace is reversed so that the gaseous flames originate at the ports 33 in the opposite side of the furnace.

Positioned forwardly of the charging end of the furnace and superimposed above the factory floor 35 is an elevated floor 36. The floor 36 may be considered a part of the general structure of the building in which the tank furnace 15 is situated and is carried from the roof girders and like members by such beams as are indicated at 37. It is on the floor 36 that the bins and weighing devices for supplying the raw granular batch materials and the glass cullet are located. In this respect, it will be noted in FIG. 1 that the areas above the doghouses 16 and 17 are individually provided with chutes 38 and 39 for the raw batch materials which are directed into hoppers 40 above the compartmented rolls 19 of the batch feeding apparatus 18. As viewed in FIGS. 1 and 2, this apparatus includes a supporting framework 41 on which is mounted a hopper 40, feed roll 19 and a source of power 42 for driving said roll.

The cullet feeding apparatus 21, to be more fully hereinafter described, is adapted to convey the cullet from a single or multiple source of supply to a trough arrangement positioned in the end breast wall 25 of the furnace from which it is discharged into the central area of the melting zone of the furnace.

Figure 2:
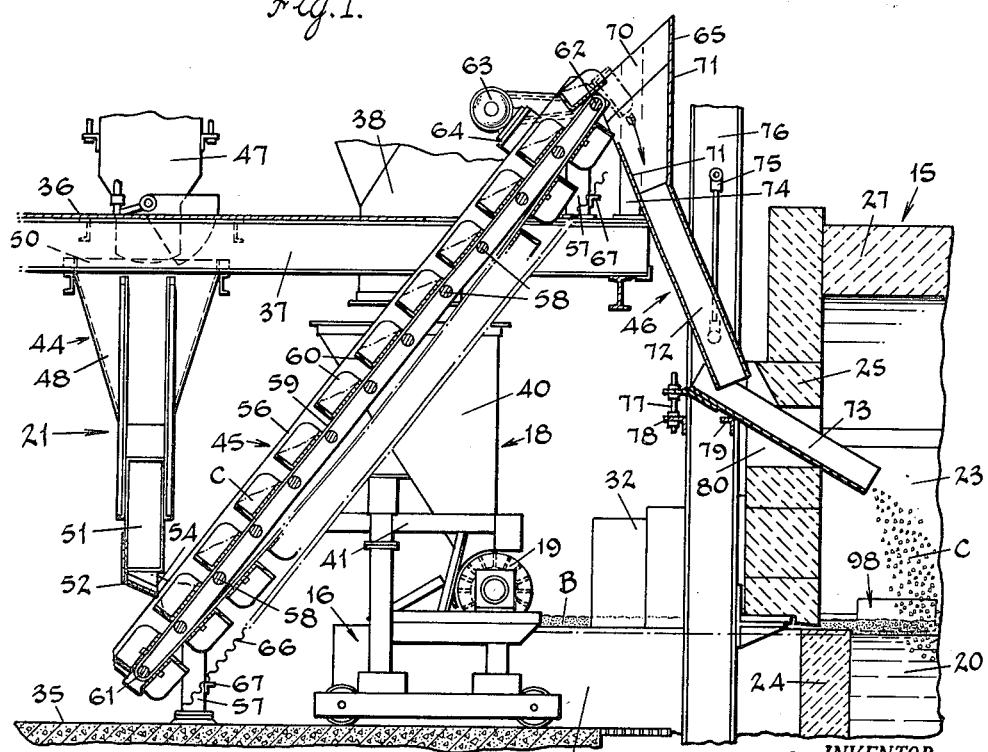
FIG. 2 is a longitudinal vertical section of the furnace and batch feeding apparatus taken on line 2—2 of FIG. 1.
Figure 3:
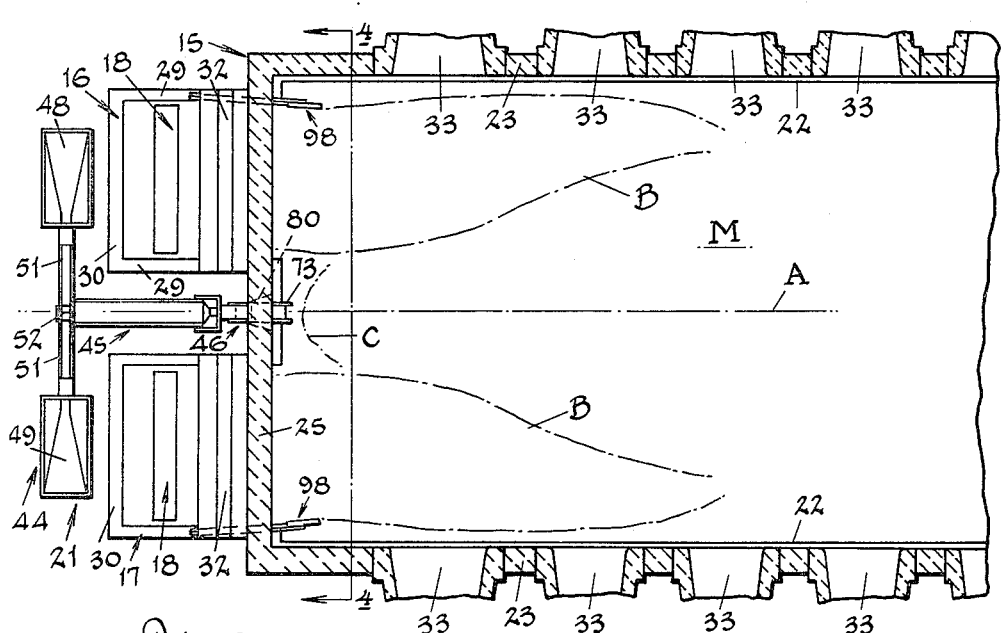
FIG. 3 is a plan view of the charging end of the tank furnace.

As viewed in FIGS. 1 and 2, the cullet feeding apparatus 21 generally includes a delivery chute 44, conveyor system 45 and feeder trough arrangement 46. The delivery chute 44 is adapted to receive glass cullet from storage bins 47 and for this purpose is located transverse to the longitudinal axis of the furnace and substantially V-shaped in structure. To this end, the delivery chute 44 has spaced, upper receiving hoppers 48 and 49 which are secured to and carried by substantially rectangular frames 50 supported by the beams 37. The hoppers 48 and 49 are provided with downwardly and inwardly inclined bottom walls which are aligned with the inclined bottom walls of troughs 51. As shown in FIGS. 1 and 3, the troughs 51 converge at substantially the medial line of the furnace and their adjoining open ends are connected to a discharge member 52, provided with an outlet opening 54 through which the cullet is supplied to the endless conveyor 45. Each trough 51 is preferably equipped with a vibrating device 53 to insure free falling of the cullet and continuous feeding to the discharge member without objectionable clogging.

The conveyor 45 generally includes a supporting framework 56, carried by pedestals 57 on the factory floor 35 and the elevated floor 36 and passing through an open area in said elevated floor. As viewed in FIG. 2, the framework 56 is angularly disposed with the lower end thereof located beneath the chute discharge member 52 and the upper end adjacent the receiving end of the feeder trough 46. By means of rollers 58, the framework supports an endless conveyor belt 59 equipped with cullet receiving buckets 60. More particularly, the belt 59 is trained about a lower roller 61 and an upper roller 62 which is power driven by a motor 63 supported by bracket 64 on the framework. As illustrated in FIG. 2, as the upwardly moving buckets pass beneath the discharge member 52 of the delivery chute 45 they receive the required amount of cullet therefrom and deliver it to the funnel-shaped upper end of a chute 65 forming part of the feeder trough arrangement 46. To protect the downwardly moving buckets on the return flight of the conveyor belt 59 from the heat of the furnace, an insulation panel 66 may be provided and supported by braces 67 attached to the pedestals 57.

The chute 65 is formed by downwardly convergent side walls 70 and related end walls 71 which merge into a substantially rectangular elongated lower tubular section 72, the lower end of which is disposed above an inclined discharge pan 73 which projects into the furnace through an opening 80 in the end breast wall 25. The chute 65 is supported at its upper end by brackets 74 on the floor 36 and adjacent its lower end by links 75 carried at their upper ends by buck-stays 76 of the furnace structure. The discharge pan 73 is mounted at its outer end by adjustable members 77 passing through lugs 78 on the buck-stays 76 and supported intermediate its ends upon a bracket 79. By suitable adjustment of the members 77, the vertical angle of the discharge pan 73 can be varied to obtain the desired "fall" of the cullet, indicated by the letter C, onto the surface of the body of molten glass therebeneath.

Figure 4:
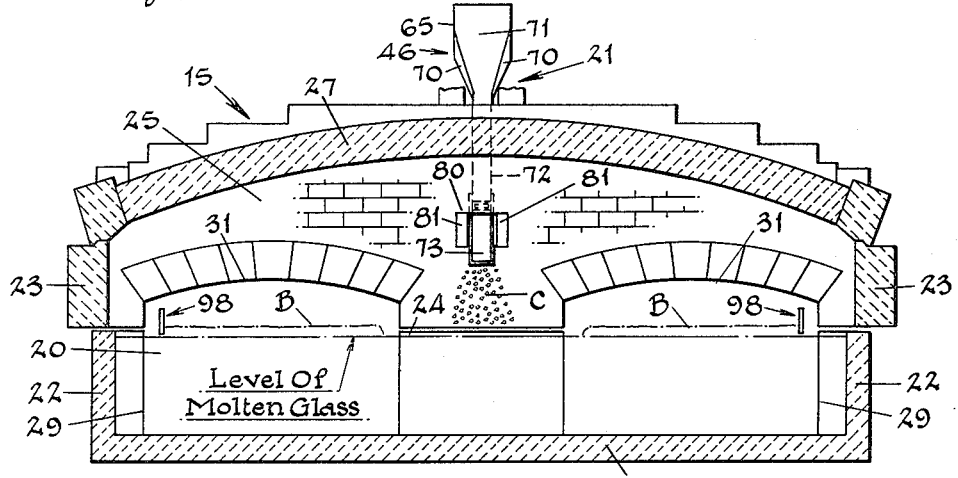
FIG. 4 is a transverse, vertical section of the furnace taken on line 4—4 of FIG. 3.

As will be seen in FIGS. 3 and 4, the side walls 81 of furnace opening 80 are inwardly divergent in order that the inner end of the discharge pan 73 can be flared, when desired, to increase the lateral width of the pattern defined by the cullet as it is delivered to the furnace.

Widening of the pattern formed by the falling cullet can also be effected by transverse swinging movement of the discharge pan 73 through a suitable drive mechanism. For this purpose, the pan 73 (FIG. 5) is pivotally supported intermediate its ends on a thermally insulated bearing member 84 mounted on a platform 85. Also carried by platform 85 is a motor 86 provided with a crank lever 87. The pan is equipped at its outer end with a bearing attachment 88 by which the crank lever 87, as it is rotated by the motor 86, will cause the pan to oscillate about the axis of bearing member 84 to discharge the cullet through a widened central area of the furnace. Under certain conditions it may be desired to deposit a larger amount of cullet to one side of the medial line of the furnace than to the other side, and this may be accomplished by controlling the oscillating motion of the discharge pan 73 in such a way that it will dwell for a relatively short period at the limit of its lateral movement in either direction.

In operation, the raw glass-making materials are received by the hoppers 40 from the respective chutes 38 and 39 and discharged therefrom into the compartments of the continuously rotating rolls 19 which deliver the batch to the furnace in the form of spaced continuous relatively thin layers designated by the letter B in FIG. 3. The layers of raw batch materials are carried forwardly from the doghouse areas on the surface of the body of molten glass 20 into the melting zone M of the furnace. As the relatively thin layers of batch B emerge from the respective doghouses, they are spaced from one another and become progressively narrower as the batch materials are melted and absorbed in the body of molten glass.

Simultaneous with the feeding of the raw batch materials, glass cullet is supplied from storage bins 47 to the delivery chute 44, as in FIGS. 1 and 2, and delivered by the conveyor 45 into the hopper 65 from which it passes to the discharge pan 73. According to the present invention, the glass cullet is discharged into the melting zone M of the furnace between the two spaced layers B of raw glass making materials as designated by the letter C in FIG. 3. Although not essential it is preferred that the glass cullet be delivered to the furnace in the form of a layer substantially equal in width to the distance between the two layers of raw glass making materials.

By feeding the raw glass making materials and cullet to the furnace in the form of separate layers it has been found possible to obtain an increased rate at which the raw granular materials can be melted since they are deposited directly on the body of molten glass and not on a layer of cullet as has been customary in the past, which layer of cullet acted as a barrier to impede upward transmission of heat from the body of molten glass. The more rapid rate of heat transmission thus serves to shorten the time required to melt the material and consequently makes possible an increased rate of feeding of the batch materials. This has also been found to accelerate the release of gases from the layers of raw batch materials. Additionally, since the amount of glass cullet fed to the furnace is no longer dependent on a permissible thickness to be formed beneath the layer of raw batch materials, the amount now supplied can be increased to the highest ratio permitted between the raw batch materials and the cullet.

It has been found that the melting of a combined layer of raw batch materials and glass cullet has been more or less completed by the time it reaches the area of the fourth port from the charging end of the furnace. However, by separately feeding the raw batch materials and cullet into the furnace according to the present invention they are completely melted in the vicinity of the third port. By reason of this shortened melting period, the feeding of the batch materials can be increased and the material still be reduced to molten consistency in the vicinity of the fourth port. Further, the amount of cullet used with the raw batch materials can be increased by approximately one-third.

Figure 6:
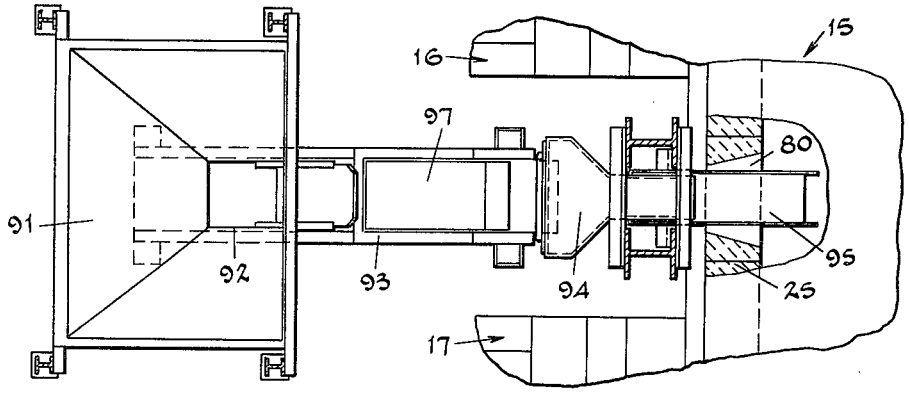
FIG. 6 is a general plan view of a modified form of batch feeding apparatus.
Figures 5, 7:
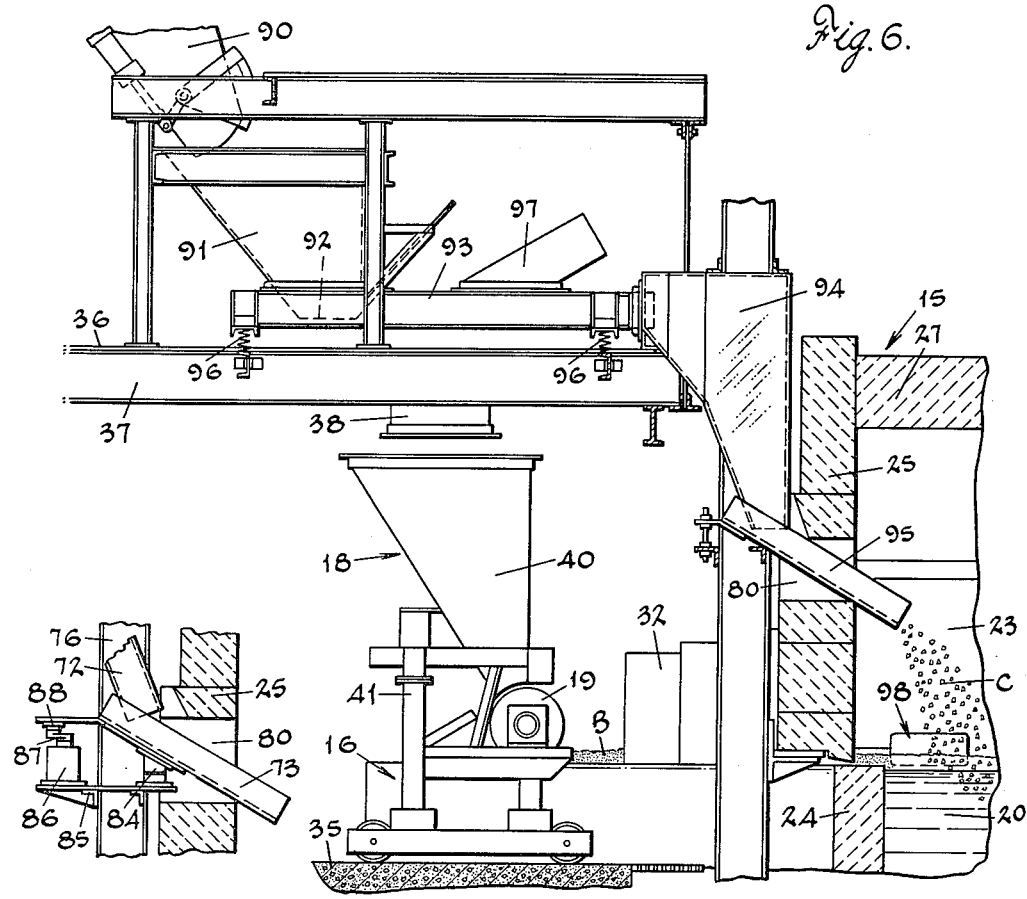
FIG. 5 is a side elevation of a modified form of discharge pan for the batch feeding apparatus.
FIG. 7 is a side elevation of the apparatus illustrated in FIG. 6, the furnace being shown in cross section.

In FIGS. 6 and 7 is shown a modified form of cullet feeding apparatus for carrying out the method of the invention. As illustrated, the glass cullet is delivered from a source of supply 90 into a hopper 91 from which it is discharged through an opening 92 in the bottom thereof into one end of a vibratory-type conveyor 93. The conveyor 93 is located in the longitudinal axis of the tank furnace 15 and the opposite or discharge end thereof opens into the upper end of a tubular chute 94 from which the cullet drops onto a discharge pan 95 which is similar to the discharge pan 73 in FIG. 2. Generally speaking, the conveyor 93 is supported above the floor 36 by springs 96 arranged at the corners thereof and actuated by a suitable vibration device 97. Aside from the fact that the hopper 91 and conveyor 93 are located in the medial line of the furnace 15 and receive glass cullet from a single source of supply 90, the feeding of the cullet from the discharge pan 95 into the central area of the furnace and between the spaced layers of raw batch materials is the same in all other respects as hereinabove described.

Figure 8:
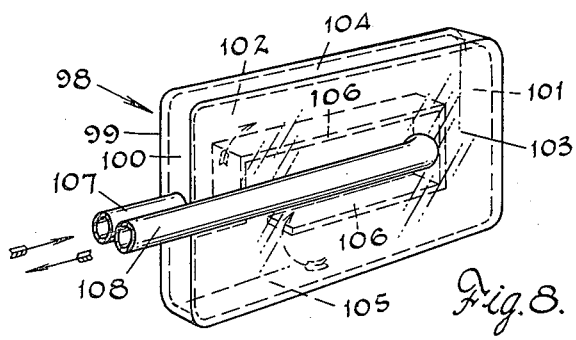
FIG. 8 is a perspective view of a batch material guide member for use in the furnace.

In order to limit the spreading of the raw batch materials into the corner areas of the furnace at the junctures of the side and end walls 22 and 24 respectively of the furnace, stationary guide members 98 are provided to prevent undesired entry of the material into the relatively slower moving glass in these corners or along the side walls. The guide members 98 are arranged as shown in FIG. 3 and supported above the surface of the molten glass as shown in FIG. 2. As illustrated in FIG. 8 each guide member comprises a relatively thin, rectangular hollow box 99 having end walls 100 and 101, vertically disposed side walls 102 and 103 and top and bottom walls 104 and 105, respectively. The guide member is maintained at a relatively low temperature by the provision of a partitioning wall 106, located within the hollow box 99 and between the side walls 102 and 103, to form a circuitous channel for the continuous flow of a coolant, such as water. For this purpose, the wall 106 is suitably shaped to direct the coolant received from an inlet pipe 107, opening through the end wall 100, along and against the top wall 104, side wall 102 and bottom wall 105 and discharged from the central area of the box through an outlet pipe 108 connected to the side wall 103. The pipes 107 and 108 are supported on the top surface of an adjacent doghouse side wall 29 and pass through the openings 31 into the interior of the furnace.

It is to be understood that the forms of the invention herewith shown and described are to be taken as illustrative embodiments only of the same, and that various changes in the shape, size, and arrangement of parts, as well as various procedural changes may be resorted to without departing from the spirit of the invention.

I claim:

1. A method of charging a glass melting tank furnace, which comprises feeding raw glass making materials into the charging end of the furnace upon a body of molten glass therein in two layers transversely spaced from one another, and simultaneously delivering glass cullet upon the body of molten glass in the furnace between the two layers of raw glass making materials.

2. A method as defined in claim 1, in which the glass cullet is delivered onto the body of molten glass in the furnace in a layer substantially equal in width to the distance between the two layers of raw glass making materials.

3. A method as defined in claim 1, in which the glass cullet is delivered onto the body of molten glass in the furnace by oscillating the point of discharge thereof transversely of the furnace to form a layer substantially equal in width to the distance between the two layers of raw glass making materials.

4. An apparatus for charging a glass melting tank furnace having a melting zone at the charging end thereof and containing a body of molten glass, comprising a pair of transversely spaced material charging areas extending from said melting zone and in communication therewith, means for depositing batch materials onto the surface of the molten glass in each of said material charging areas in a continuous layer and advancing said layers into said melting zone, an end breast wall extending across said tank furnace between said melting zone and said material charging areas beneath which said layers of batch materials advance into said melting zone, and cullet feeding means extending through said end breast wall for continuously depositing a layer of cullet onto the surface of the molten glass in said melting zone in the space between the layers of batch materials.

5. An apparatus for charging a glass melting tank furnace as claimed in claim 4, wherein said cullet feeding means comprises a discharge pan projecting through said end breast wall into the furnace for depositing the glass cullet onto the molten glass in a layer substantially equal in width to said space between the layers of batch materials.

6. An apparatus for charging a glass melting tank furnace as claimed in claim 5, said discharge pan being pivotally supported, and including means for oscillating said discharge pan on said pivotal support transversely of the furnace.

7. An apparatus for charging a glass melting tank furnace having a melting zone at the charging end thereof and containing a body of molten glass, comprising a pair of transversely spaced material charging areas extending from said melting zone and in communication therewith, an end breast wall extending across said tank furnace above said body of molten glass between said melting zone and said material charging areas, batch feeding apparatus positioned over each said material charging area, each said feeding apparatus including a hopper for receiving a supply of batch materials and a feed roll extending transversely across said charging area for depositing batch materials from said hopper onto the surface of the molten glass in said charging area in a continuous layer and advancing said layer into said melting zone beneath said breast wall, a source of supply of glass cullet, and a discharge pan extending through said end breast wall between said spaced material charging areas for receiving cullet from said source of supply and continuously depositing a layer of said cullet onto the surface of the molten glass in said melting zone between the spaced layers of batch materials.

References Cited by the Examiner

UNITED STATES PATENTS

| | | | |
|---|---|---|---|
| 1,917,247 | 7/33 | Good | 214—35 |
| 2,773,611 | 12/56 | Henry et al. | 214—35 |
| 3,074,568 | 1/63 | Manbourg et al. | 214—18 |

HUGO O. SCHULZ, *Primary Examiner.*